United States Patent
Han et al.

(10) Patent No.: US 9,544,596 B1
(45) Date of Patent: Jan. 10, 2017

(54) OPTIMIZED TEMPLATE MATCHING APPROACH TO INTRA-CODING IN VIDEO/IMAGE COMPRESSION

(71) Applicant: GOOGLE INC., Mountain View, CA (US)

(72) Inventors: Jingning Han, Santa Clara, CA (US); Hui Su, College Park, MD (US); Yaowu Xu, Saragtoga, CA (US)

(73) Assignee: Google Inc., Mountain View, CA (US)

( * ) Notice: Subject to any disclaimer, the term of this patent is extended or adjusted under 35 U.S.C. 154(b) by 182 days.

(21) Appl. No.: 14/141,778

(22) Filed: Dec. 27, 2013

(51) Int. Cl.
*H04N 11/04* (2006.01)
*H04N 7/26* (2006.01)
*H04N 19/51* (2014.01)
*H04N 19/577* (2014.01)
*H04N 19/583* (2014.01)
*G06K 9/36* (2006.01)
*H04N 19/60* (2014.01)

(52) U.S. Cl.
CPC ............... *H04N 19/00775* (2013.01)

(58) Field of Classification Search
CPC .............................. H04N 19/00775
USPC ...................... 375/240.18
See application file for complete search history.

(56) References Cited

U.S. PATENT DOCUMENTS

| | | | |
|---|---|---|---|
| 8,873,626 B2* | 10/2014 | Karczewicz | H04N 19/00733 375/240.15 |
| 2010/0246675 A1* | 9/2010 | Gharavi-Alkhansari | H04N 19/105 375/240.13 |
| 2011/0170793 A1* | 7/2011 | Sato | H04N 19/105 382/238 |

OTHER PUBLICATIONS

Cherigui, et al, "Hybrid Template and Block Matching Algorithm for Image Intra Prediction", ICASSP 2012, pp. 781-784.
Grange, et al, "A VP9 Bitstream Overview", Network Working Group, Internet Draft, Feb. 18, 2013, 14 pages.
Han, et al, "Jointly optimized spatial prediction and block transform for video and image coding," IEEE Trans. on Image Processing, vol. 21, Apr. 2012, pp. 1874-1884.
Han, et al, "Towards jointly optimal spatial prediction and adaptive transform in video/image coding," IEEE Proc. ICASSP, Mar. 2010, pp. 726-729.
Tan, et al, "Intra Prediction by Averaged Template Matching Predictors", IEEE 2007, pp. 405-409.

(Continued)

*Primary Examiner* — Hee-Yong Kim
(74) *Attorney, Agent, or Firm* — Brake Hughes Bellermann LLP

(57) ABSTRACT

A system includes an encoder and a decoder. The encoder selects a first matched template for un-encoded pixels of a video frame using an algorithm for measuring a similarity between image blocks of the video frame, the algorithm being based on a weighted scheme of reconstructed adjacent pixels, generates at least one residual for the un-encoded pixels of the video frame based on the matched template, and encodes residuals as compressed bits using an asymmetric discrete sine transform (ADST). The decoder decodes the compressed video bits as residuals using the ADST, selects a second matched template using an algorithm for measuring a similarity between image blocks of a video frame associated with the compressed video bits, the algorithm being based on a weighted scheme of reconstructed adjacent pixels, and generates reconstructed pixels of the video frame based on the matched template and the decoded compressed video bits.

21 Claims, 12 Drawing Sheets

(56) References Cited

OTHER PUBLICATIONS

Tan, et al, "Intra Prediction by Template Matching", ICIP 2006, pp. 1693-1696.
Tan et al., "Intra Prediction by Template Machine," IEEE International Conference on Image Processing (ICIP) 2006, pp. 1693-1696.
Bankoski et al., "Technical Overview of VP8, An Open Source Video Codec for the Web," ICME '11 Proceedings of the 2011 IEEE International Conference on Multimedia and Expo, Jul. 11-15, 2011, 6 pages.
Xu et al., "Inside WebM Technology: VP8 Intra and Inter Prediction," Jul. 20, 2010, downloaded on Aug. 2, 2016 from http://blog.webmproject.org/2010/07/inside-webm-technology-vp8-intra-and.html.
Yu et al., "New Intra Prediction Using Intra-Macroblock motion compensation," Tech. Rep. JVT-C151, 2002.

\* cited by examiner

OPTIMIZED TEMPLATE MATCHING APPROACH TO INTRA-CODING IN VIDEO/IMAGE COMPRESSION

BACKGROUND

Typically a conventional two dimensional discrete cosine transform (2D-DCT) is applied to prediction residuals associated with a template matched intra-coding scheme. However, use of the 2D-DCT is questionable because the discrete cosine transform (DCT) basis functions get to the maximal magnitude at both ends and are agnostic to the statistical characteristics of the residuals. As a result, there is a need for a template matched intra-coding scheme where the statistical characteristics of the residuals are taken into consideration.

SUMMARY

This disclosure relates to encoding video data. More specifically, this disclosure relates to encoding and decoding video data utilizing a matched template and an asymmetric discrete sine transform (ADST).

In a general aspect, a method for encoding video data includes selecting a matched template for un-encoded pixels of a video frame using an algorithm for measuring a similarity between image blocks of the video frame, the algorithm being based on a weighted scheme of reconstructed adjacent pixels, generating at least one residual for the un-encoded pixels of the video frame based on the matched template, and encoding residuals using an asymmetric discrete sine transform (ADST).

In another general aspect, a method for decoding video data includes decoding compressed video bits as residuals using an asymmetric discrete sine transform (ADST), selecting a matched template using an algorithm for measuring a similarity between image blocks of a video frame associated with the compressed video bits, the algorithm being based on a weighted scheme of reconstructed adjacent pixels, and generating reconstructed pixels of the video frame based on the matched template and the decoded compressed video bits.

In yet another general aspect, a system includes an encoder and a decoder. The encoder selects a first matched template for un-encoded pixels of a video frame using an algorithm for measuring a similarity between image blocks of the video frame, the algorithm being based on a weighted scheme of reconstructed adjacent pixels, generates at least one residual for the un-encoded pixels of the video frame based on the matched template, and encodes residuals as compressed bits using an asymmetric discrete sine transform (ADST). The decoder decodes the compressed video bits as residuals using the ADST, selects a second matched template using an algorithm for measuring a similarity between image blocks of a video frame associated with the compressed video bits, the algorithm being based on a weighted scheme of reconstructed adjacent pixels, and generates reconstructed pixels of the video frame based on the matched template and the decoded compressed video bits.

DETAILED DESCRIPTION OF THE EMBODIMENTS

Figure 1A:
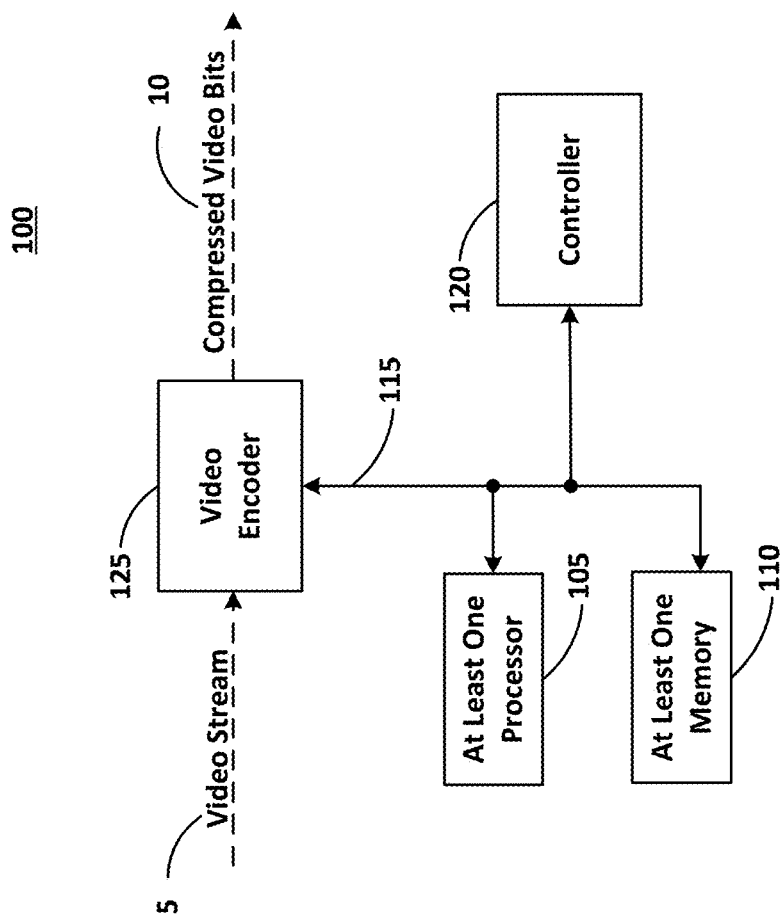
FIG. 1A illustrates a video encoder system according to at least one example embodiment.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims.

Furthermore, the figures are intended to illustrate the general characteristics of methods and/or structure utilized in certain example embodiments and to supplement the written description provided below. These figures are not, however, to scale and may not precisely reflect the precise structural or performance characteristics of any given embodiment, and should not be interpreted as defining or limiting the range of values or properties encompassed by example embodiments. For example, the structural elements may be reduced or exaggerated for clarity. The use of similar or identical reference numbers in the various drawings is intended to indicate the presence of a similar or identical element or feature.

Intra-frame coding is an important component in video/image compression system. Intra-frame coding predicts from previously reconstructed neighboring pixels to largely remove spatial redundancies. A codec typically allows various prediction directions, and the encoder selects the one that best describes the texture patterns (and hence rendering minimal rate-distortion cost) for block coding. Such boundary extrapolation based prediction is efficient when the image signals are well modeled by a first-order Markovian process. In practice, however, image signals can contain complicated patterns repeatedly appearing, in which the boundary prediction approach can not effectively capture.

Example embodiments describe an initial block matching prediction, which searches in the previously reconstructed frame area for reference, as an additional Intra-frame coding mode. Accordingly, a template matching prediction (TMP) approach utilizes the available neighboring pixels of a block (also can be referred to as an image block) as a template, measures the template similarity between the block of interest and the candidate references, and chooses the most "similar" one as the prediction. The decoder is configured to repeat the same process which allows the TMP to operate in smaller block size for more precise prediction at no additional resource costs.

In viewing the image signals as an autoregressive process, pixels close to the block boundaries of the block being encoded are more correlated to the pixels of the template, and hence are better predicted by the matched reference, than those pixels that are further away from to the block boundaries of the block being encoded. Therefore, the residuals can exhibit smaller variance at the known boundaries and gradually increased energy to the opposite end. As a result, the efficacy of the use of DCT is questionable because the DCT basis functions get to the maximal magnitude at both ends and are agnostic to the statistical characteristics of the residuals. Therefore, example embodiments address this issue by applying an asymmetric discrete sine transform (ADST), whose basis functions possess the desired asymmetric properties, to the TMP residuals for optimal coding performance. Further, the TMP itself can be based on pixels close, proximate and/or adjacent to the block boundaries of the block being encoded.

In the example of FIG. 1A, a video encoder system 100 may be, or include, at least one computing device and should be understood to represent virtually any computing device configured to perform the methods described herein. As such, the video encoder system 100 may be understood to include various components which may be utilized to implement the techniques described herein, or different or future versions thereof. By way of example, the video encoder system 100 is illustrated as including at least one processor 105, as well as at least one memory 110 (e.g., a non-transitory computer readable storage medium).

FIG. 1A illustrates the video encoder system according to at least one example embodiment. As shown in FIG. 1A, the video encoder system 100 includes the at least one processor 105, the at least one memory 110, a controller 120, and a video encoder 125. The at least one processor 105, the at least one memory 110, the controller 120, and the video encoder 125 are communicatively coupled via bus 115.

As may be appreciated, the at least one processor 105 may be utilized to execute instructions stored on the at least one memory 110, so as to thereby implement the various features and functions described herein, or additional or alternative features and functions. Of course, the at least one processor 105 and the at least one memory 110 may be utilized for various other purposes. In particular, it may be appreciated the at least one memory 110 may be understood to represent an example of various types of memory and related hardware and software which might be used to implement any one of the modules described herein.

The at least one memory 110 may be configured to store data and/or information associated with the video encoder system 100. For example, the at least one memory 110 may be configured to store codecs associated with an ADST. For example, the at least one memory may be configured to store video frames and/or reconstructed video frames. The at least one memory 110 may be a shared resource. For example, the video encoder system 100 may be an element of a larger system (e.g., mobile device). Therefore, the at least one memory 110 may be configured to store data and/or information associated with other elements (e.g., web browsing or wireless communication) within the larger system.

The controller 120 may be configured to generate various control signals and communicate the control signals to various blocks in video encoder system 100. The controller 120 may be configured to generate the control signals to implement the techniques described below. The controller 120 may be configured to control the video encoder 125 to encode a video frame according to example embodiments. For example, the controller 120 may generate control signals corresponding to a selection of an intra-coding scheme that includes template matching and ADST. More details related to the functions and operation of the video encoder 125 and controller 120 will be described below in connection with at least FIGS. 3-9.

The video encoder 125 may be configured to receive a video stream input 5 and output compressed (e.g., encoded) video bits 10. The video encoder 125 may convert the video stream input 5 into discrete video frames. The video encoder 125 may further convert each discrete video frame into a matrix of blocks (hereinafter referred to as blocks). For example, a video frame may be converted to a 16×16, a 16×8, an 8×8 or a 4×4 matrix of blocks each having a number of pixels. Although four example matrices are listed, example embodiments are not limited thereto.

The compressed video bits 10 may represent the output of the video encoder system 100. For example, the compressed video bits 10 may represent an encoded video frame. For example, the compressed video bits 10 may be ready for transmission to a receiving device (not shown). For example, the video bits may be transmitted to a system transceiver (not shown) for transmission to the receiving device.

The at least one processor 105 may be configured to execute computer instructions associated with the controller 120 and/or the video encoder 125. The at least one processor 105 may be a shared resource. For example, the video encoder system 100 may be an element of a larger system (e.g., a mobile device). Therefore, the at least one processor 105 may be configured to execute computer instructions associated with other elements (e.g., web browsing or wireless communication) within the larger system.

Figure 1B:
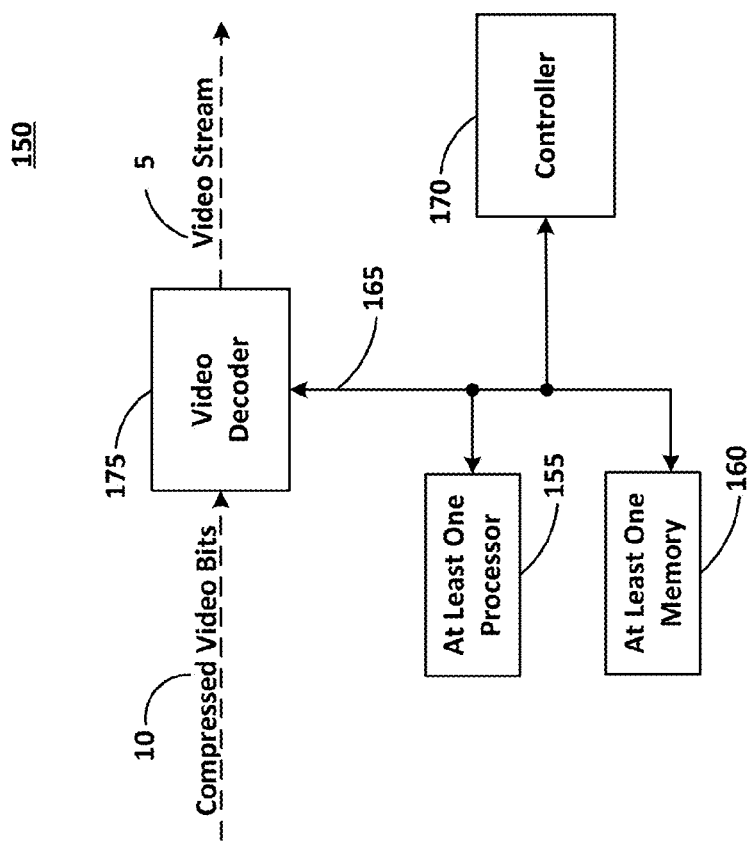
FIG. 1B illustrates a video decoder system according to at least one example embodiment.

In the example of FIG. 1B, a video decoder system 150 may be at least one computing device and should be understood to represent virtually any computing device configured to perform the methods described herein. As such, the video decoder system 150 may be understood to include various components which may be utilized to implement the techniques described herein, or different or future versions thereof. By way of example, the video decoder system 150 is illustrated as including at least one processor 155, as well as at least one memory 160 (e.g., a computer readable storage medium).

Thus, as may be appreciated, the at least one processor 155 may be utilized to execute instructions stored on the at least one memory 160, so as to thereby implement the various features and functions described herein, or additional or alternative features and functions. Of course, the at least one processor 155 and the at least one memory 160 may be utilized for various other purposes. In particular, it may be appreciated the at least one memory 160 may be understood to represent an example of various types of memory and related hardware and software which might be used to implement any one of the modules described herein. According to example embodiments, the video encoder system 100 and the video decoder system 150 may be included in a same larger system (e.g., a mobile device).

The at least one memory 160 may be configured to store data and/or information associated with the video decoder system 150. For example, the at least one memory 110 may be configured to store codecs associated with an ADST. For example, the at least one memory may be configured to store video frames and/or reconstructed video frames. The at least one memory 160 may be a shared resource. For example, the video decoder system 150 may be an element of a larger system (e.g., mobile device). Therefore, the at least one memory 160 may be configured to store data and/or information associated with other elements (e.g., web browsing or wireless communication) within the larger system.

The controller 170 may be configured to generate various control signals and communicate the control signals to various blocks in video decoder system 150. The controller 170 may be configured to generate the control signals in order to implement the video encoding/decoding techniques described below. The controller 170 may be configured to control the video decoder 175 to decode a video frame according to example embodiments. The controller 170 may be configured to generate control signals corresponding to a selection of an intra-coding scheme that includes template matching and ADST. More details related to the functions and operation of the video decoder 175 and controller 170 will be described below in connection with at least FIGS. 3-9.

The video decoder 175 may be configured to receive a compressed (e.g., encoded) video bits 10 input and output a video stream 5. The video decoder 175 may convert discrete video frames of the compressed video bits 10 into the video stream 5.

The at least one processor 155 may be configured to execute computer instructions associated with the controller 170 and/or the video decoder 175. The at least one processor 155 may be a shared resource. For example, the video decoder system 150 may be an element of a larger system (e.g., a mobile device). Therefore, the at least one processor 155 may be configured to execute computer instructions associated with other elements (e.g., web browsing or wireless communication) within the larger system.

Figure 2A:
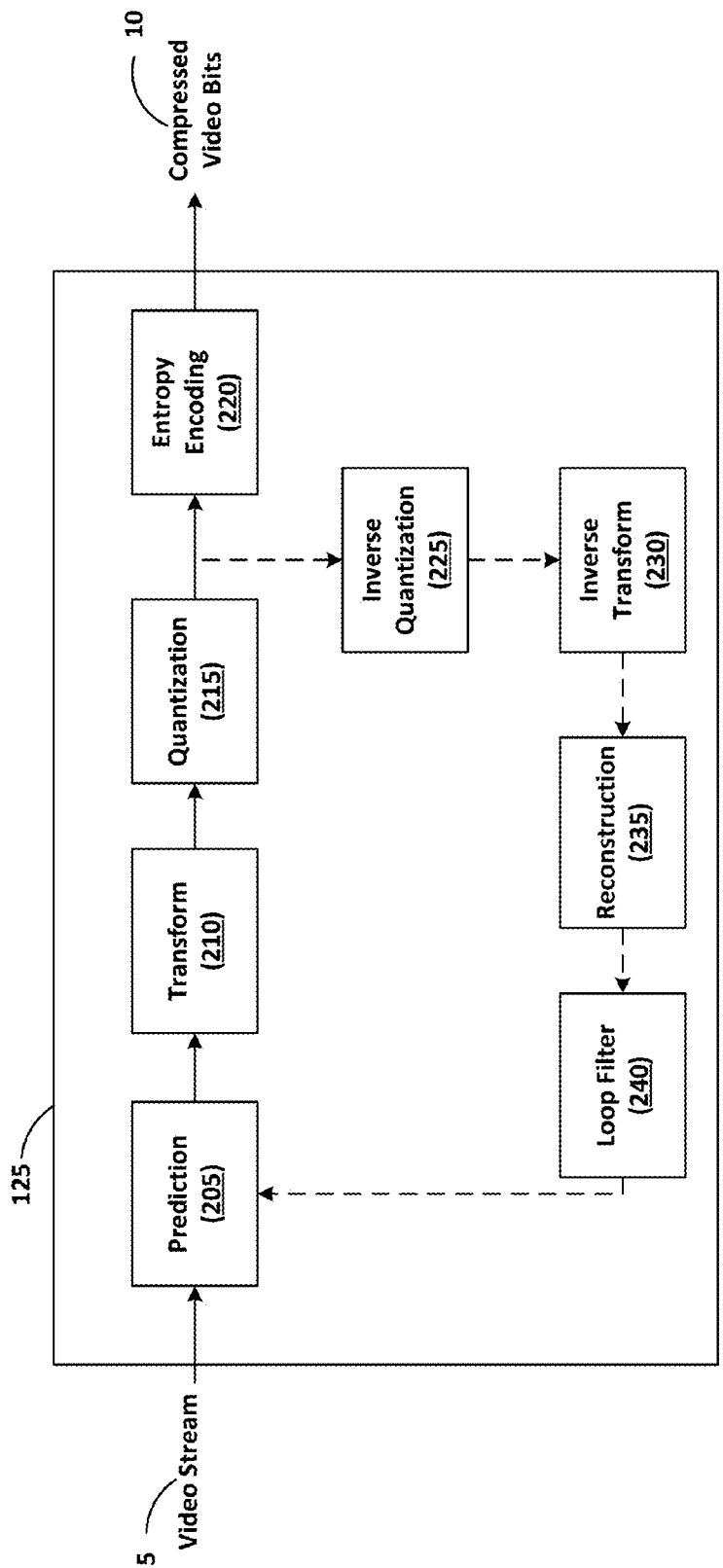
FIG. 2A illustrates a flow diagram for a video encoder system according to at least one example embodiment.
Figure 2B:
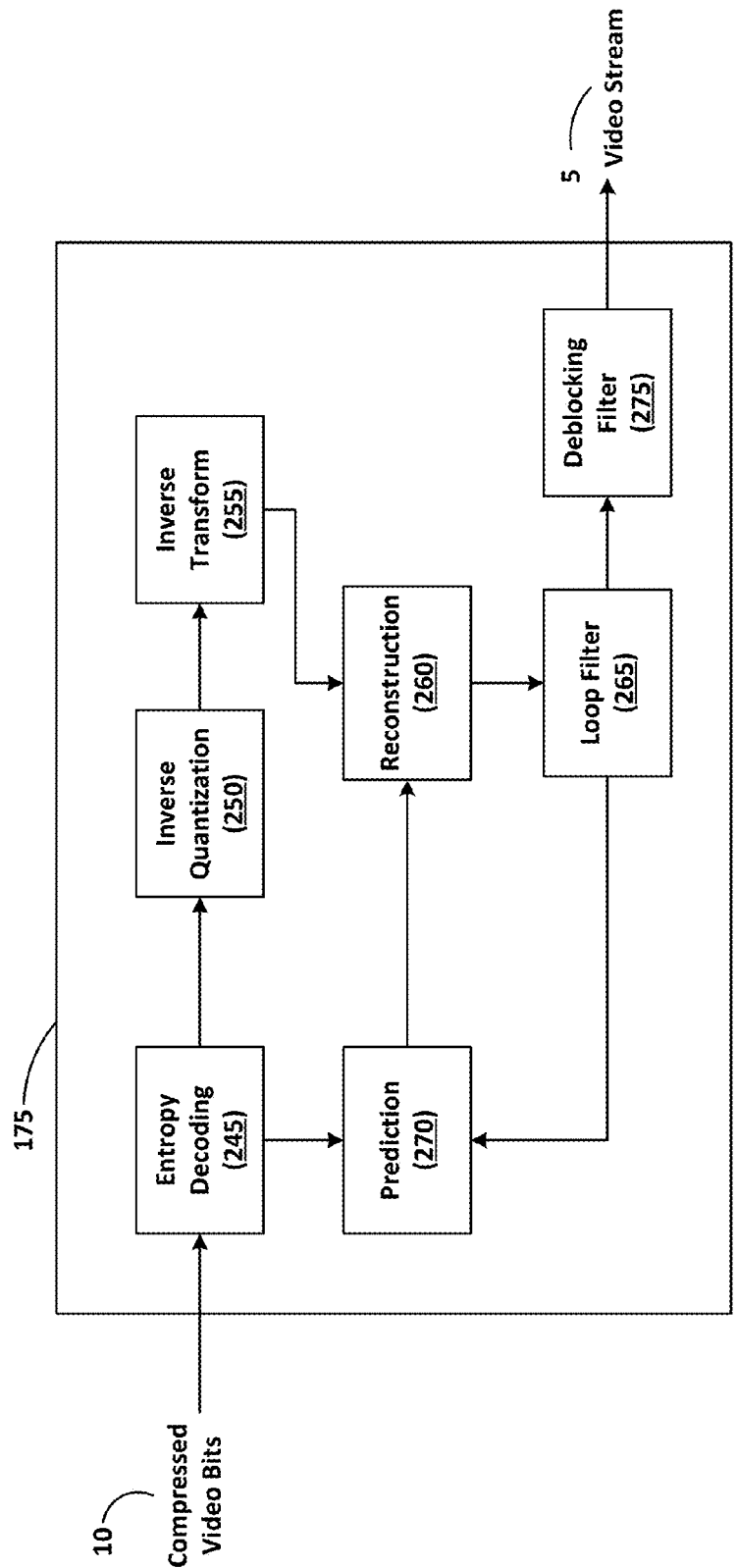
FIG. 2B illustrates a flow diagram for a video decoder system according to at least one example embodiment.

FIGS. 2A and 2B illustrate a flow diagram for the video encoder 125 shown in FIG. 1A and the video decoder 175 shown in FIG. 1B, respectively, according to at least one example embodiment. The video encoder 125 (described above) includes a prediction block 205, a transform block 210, a quantization block 215, an entropy encoding block 220, an inverse quantization block 225, an inverse transform block 230, a reconstruction block 235, and a loop filter block 240. Other structural variations of video encoder 125 can be used to encode input video stream 5. As shown in FIG. 2A, dashed lines represent a reconstruction path amongst the several blocks and solid lines represent a forward path amongst the several blocks.

Each of the aforementioned blocks may be executed as software code stored in a memory (e.g., at least one memory 110) associated with a video encoder system (e.g., as shown in FIG. 1A) and executed by at least one processor (e.g., at least one processor 105) associated with the video encoder system. However, alternative embodiments are contemplated such as a video encoder embodied as a special purpose processor. For example, each of the aforementioned blocks (alone and/or in combination) may be an application-specific integrated circuit (ASIC). For example, the ASIC may be configured as the transform block 210 and/or the quantization block 215.

The prediction block 205 may be configured to utilize video frame coherence (e.g., pixels that have not changed as compared to previously encoded pixels). Prediction may include two types. For example, prediction may include intra-frame prediction and inter-frame prediction. Intra-frame prediction relates to predicting the pixel values in a block of a picture relative to reference samples in neighboring, previously coded blocks of the same picture. In intra-frame prediction, a sample is predicted from reconstructed pixels within the same frame for the purpose of reducing the residual error that is coded by the transform (e.g., entropy encoding block 220) and entropy coding (e.g., entropy encoding block 220) part of a predictive transform codec.

Inter-frame prediction relates to predicting the pixel values in a block of a picture relative to data of a previously coded picture. Example embodiments relate to intra-frame prediction. Therefore, for the sake of brevity, inter-frame prediction will not be discussed further.

Typically, intra-frame prediction includes one or more of ten modes. For example, the intra-frame prediction modes include DC, Vertical, Horizontal, TM (True Motion), Horizontal Up, Left Diagonal, Vertical Right, Vertical Left, Right Diagonal, and Horizontal Down. In addition, according to example embodiments, intra-frame prediction may include a template matching prediction (TMP) mode. As discussed above TMP employs the above row and left column pixels of a block as the blocks template. The template similarity between the block of interest and a candidate reference block selected from a reconstructed image area are then evaluated in terms of an algorithm for measuring the similarity between image blocks (e.g., SAD or SSD). The encoder selects amongst the candidate blocks the one that best resembles the target template as the prediction.

The transform block 210 may be configured to convert the values of the pixels from the spatial domain to transform coefficients in a transform domain. The transform coefficients may correspond to a two-dimensional matrix of coefficients that is ordinarily the same size as the original block. In other words, there may be as many transform coefficients as pixels in the original block. However, due to the transform, a portion of the transform coefficients may have values equal to zero.

The transform block 210 may be configured to transform the residual (from the prediction block 205) into transform coefficients in, for example, the frequency domain. Typically, transforms include the Karhunen-Loève Transform (KLT), the Discrete Cosine Transform (DCT) and the Singular Value Decomposition Transform (SVD). As discussed above, the basis functions of the conventional DCT achieve their maximum energy at both ends and are agnostic to the statistical patterns of the prediction residuals. Therefore, according to example embodiments, the transform block 210 may be configured to transform the residual using an asymmetric discrete sine transform (ADST).

The quantization block 210 may be configured to reduce the data in each transformation coefficient. Quantization may involve mapping values within a relatively large range to values in a relatively small range, thus reducing the amount of data needed to represent the quantized transform coefficients. The quantization block 210 may convert the transform coefficients into discrete quantum values, which are referred to as quantized transform coefficients or quantization levels. For example, the quantization block 210 may be configured to add zeros to the data associated with a transformation coefficient. For example, an encoding standard may define 128 quantization levels in a scalar quantization process.

The quantized transform coefficients are then entropy encoded by entropy encoding block 220. The entropy-encoded coefficients, together with the information required to decode the block, such as the type of prediction used, motion vectors and quantizer value, are then output as the compressed video bits 10. The compressed video bits 10 can be formatted using various techniques, such as run-length encoding (RLE) and zero-run coding.

The reconstruction path in FIG. 2A is present to ensure that both the video encoder 125 and the video decoder 175 (described below with regard to FIG. 2B) use the same reference frames to decode compressed video bits 10. The reconstruction path performs functions that are similar to functions that take place during the decoding process that are discussed in more detail below, including inverse quantizing the quantized transform coefficients at the inverse quantization block 225 and inverse transforming the inverse quantized transform coefficients at the inverse transform block 230 in order to produce a derivative residual block (derivative residual). At the reconstruction block 235, the prediction block that was predicted at the prediction block 205 can be added to the derivative residual to create a reconstructed block. A loop filter 240 can then be applied to the reconstructed block to reduce distortion such as blocking artifacts.

The video encoder 125 described above with regard to FIG. 2A includes the blocks shown. However, example embodiments are not limited thereto. Additional blocks may be added based on the different video encoding configurations and/or techniques used. Further, each of the blocks shown in the video encoder 125 described above with regard to FIG. 2A may be optional blocks based on the different video encoding configurations and/or techniques used.

FIG. 2B is a schematic block diagram of a decoder 175 configured to decode compressed video bits 10. Decoder 175, similar to the reconstruction path of the encoder 125 discussed previously, includes an entropy decoding block 245, an inverse quantization block 250, an inverse transform block 255, a reconstruction block 260, a loop filter block 265, a prediction block 270, and a deblocking filter block 275.

The data elements within the compressed video bits 10 can be decoded by entropy decoding block 245 (using, for example, Context Adaptive Binary Arithmetic Decoding) to produce a set of quantized transform coefficients. Inverse quantization block 250 dequantizes the quantized transform coefficients, and inverse transform block 255 inverse transforms (using ADST) the dequantized transform coefficients to produce a derivative residual that can be identical to that created by the reconstruction stage in the encoder 175.

Using header information decoded from the compressed video bits 10, decoder 175 can use prediction block 270 to create the same prediction block as was created in encoder 175. The prediction block can be added to the derivative residual to create a reconstructed block by the reconstruction block 260. The loop filter block 265 can be applied to the reconstructed block to reduce blocking artifacts. Deblocking filter block 275 can be applied to the reconstructed block to reduce blocking distortion, and the result is output as video stream 5.

The video decoder 175 described above with regard to FIG. 2B includes the blocks shown. However, example embodiments are not limited thereto. Additional blocks may be added based on the different video encoding configurations and/or techniques used. Further, each of the blocks shown in the video decoder 175 described above with regard to FIG. 2B may be optional blocks based on the different video encoding configurations and/or techniques used.

Figure 3:
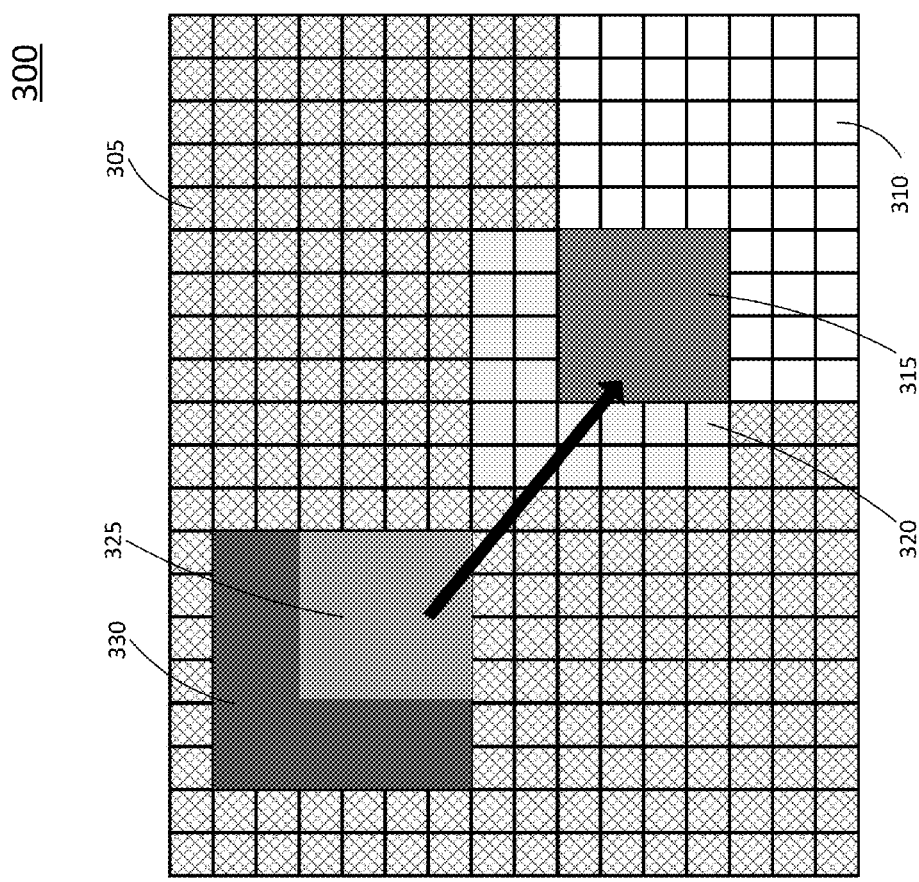
FIGS. 3 and 4 illustrate block diagrams of video frame(s)/block(s) according to at least one example embodiment.
Figure 4:
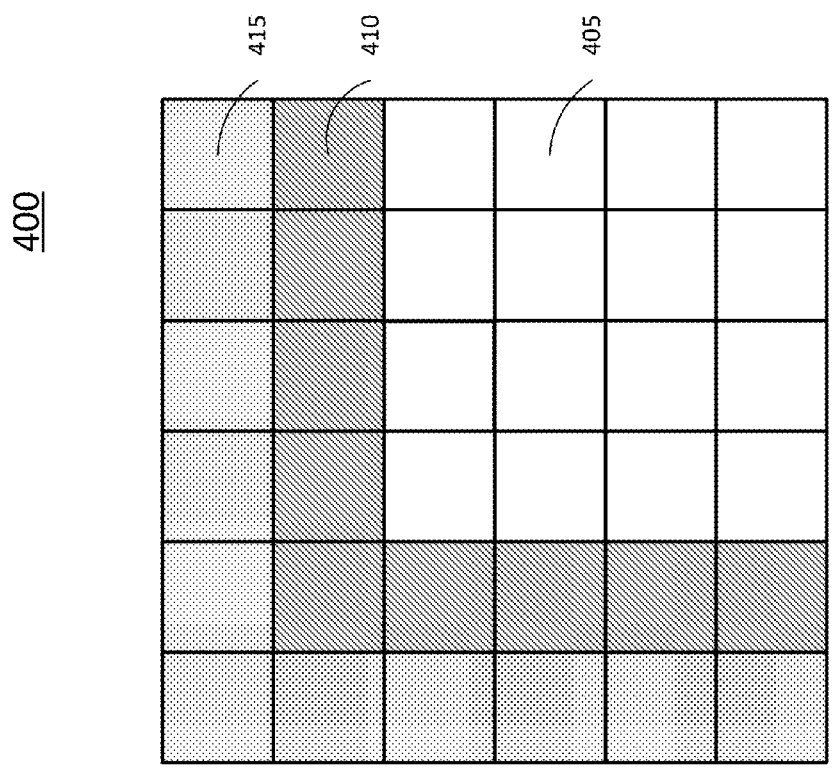

FIGS. 3 and 4 illustrate block diagrams of video frame(s)/block(s) according to at least one example embodiment. As shown in FIG. 3, a block of video data (e.g., pixels) includes a number of reconstructed pixels 305, a number of to be coded pixels 310, a target block 315, a target template 320, a prediction block 325 and a candidate template 330. Template matching prediction (TMP) employs the above row and left column pixels of a block as the target block's 315 target template 320. The template similarity between the target block 315 and the prediction block 325 is then evaluated using an algorithm for measuring the similarity between image blocks (e.g., sum of absolute difference (SAD) and sum of squared difference (SSD)). The encoder (e.g., video encoder 125) selects, from amongst the prediction block(s) 325, the candidate template 330 that best resembles the target template 320 as the prediction. TMP involves comparing reconstructed pixels. Therefore, the same operations can be repeated at a decoder (e.g., decoder 175) without additional side information (e.g., information regarding the template) sent by the encoder.

In example implementations, multiple rows and columns of boundary pixels may be defined as the template of a block as shown in FIG. 4 and the example implementations may use a sum of absolute difference (SAD) as a measurement. The template pixels closer to the block 410 can be highly correlated to the content of block 405. As a result, a weighted scheme of reconstructed adjacent pixels can be utilized such that the template pixels closer to the block 410 can be more weighted in the SAD than those distant to the block 415. In one example implementation, the template may include 2 rows and 2 columns of pixels above and to the left of any given (un-encoded) block, and a weight ratio of 3:2 for the inner row/column versus the outer row/column may be used. Although the example is of a template including 2 rows and 2 columns of pixels, example embodiments are not limited thereto.

Figure 5:
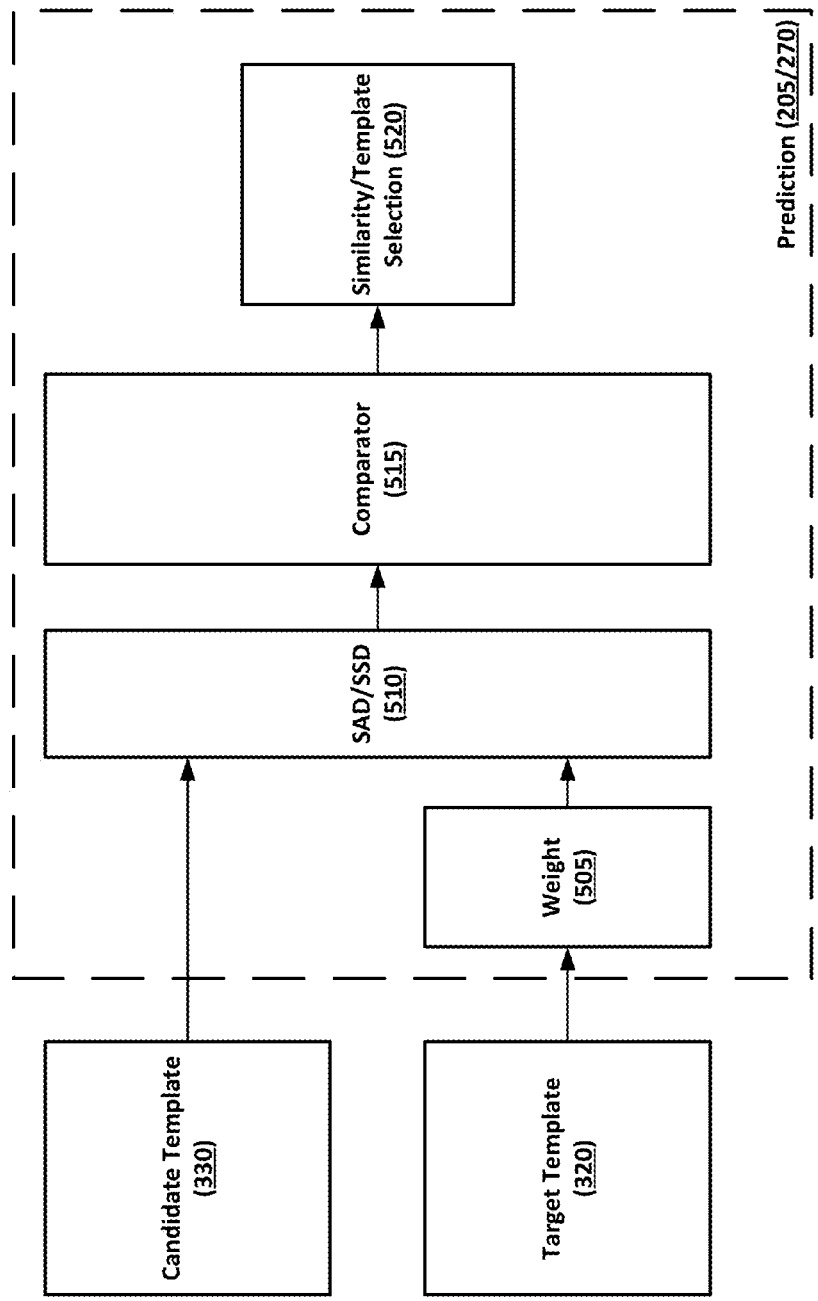
FIG. 5 illustrates a flow diagram for template prediction according to at least one example embodiment.

FIG. 5 illustrates a flow diagram for template prediction (e.g., the prediction block 205 and/or prediction block 270 described above) according to at least one example embodiment. The flow diagram for template prediction includes weight block 505, SAD/SSD block 510, comparator block 515, similarity/template selection block 520.

Weight block 505 may be configured to assign weights to pixels in a target template block. For example, as described above with regard to FIG. 4, the template pixels closer to the block 410 can be more weighted in the SAD than those distant to the block 415. Accordingly, a weighting value may be used (e.g., in a multiplication operation) for each template pixel based on proximity to the image block to be encoded. In one example implementation of FIG. 4, the template may include 2 rows and 2 columns of pixels above and to the left of any given (un-encoded) block, and a weight ratio of 3:2 for the inner row/column versus the outer row/column may be used.

For example, selecting the matched template may include selecting at least two rows and/or columns of pixels. In one example implementation, a first row of pixels and a second row of pixels may be selected. The first row of pixels may be adjacent above row of pixels (e.g., the row associated with block 410) and the second row of pixels may be a second adjacent above row of pixels (e.g., the row associated with block 415). In this example implementation, the second adjacent above row of pixels is an outer row and the first adjacent above row of pixels is an inner row as compared to the un-encoded pixels of a video frame.

Alternatively, in another example implementation, a first column of pixels and a second column of pixels may be selected. The first column of pixels may be adjacent left column of pixels (e.g., the column associated with block 410) and the second column of pixels may be a second adjacent left column of pixels (e.g., the column associated with block 415). In this example implementation, the second adjacent left column of pixels is an outer column and the first adjacent left column of pixels is an inner column as compared to the un-encoded pixels of a video frame.

In both above examples, selecting the matched template may further include applying a weight ratio to the first row of pixels and the second row of pixels and/or the first column of pixels and the second column of pixels, respectively, such that inner pixels (e.g., the first adjacent above row of pixels and/or the first adjacent left column of pixels) are given a higher weight than the outer pixels (e.g., the second adjacent above row of pixels and/or the second adjacent left column of pixels). In both above examples, selecting the matched template may further include selecting the matched template based on the weighted first row and/or column of pixels and the second row and/or column of pixels.

SAD/SSD block 510 may be configured to determine the similarity between a target template and a candidate template. Typically, a SAD and a SSD algorithm (other algorithms for measuring the similarity between image blocks are also within the scope of this disclosure) is used for measuring the similarities between images by calculating the absolute differences between the pixels of the reconstructed image block (e.g., the candidate template 330) and corresponding pixels in an image block to be encoded (e.g., target template 320) in the macro block and then these differences are added up. SAD is calculated by subtracting pixels within a square neighborhood between the candidate template 330 and the target template 320 followed by the aggregation of absolute differences within the square window. An example SAD equation is as follows:

$$\Sigma_{(i,j) \in W} |I_1(i,j) - I_2(x+i, y+j)|, \quad (1)$$

where, $I_1$ and $I_2$ are images to be compared and i, j, x+i and x+j are respective pixel position values.

An example SAD equation is as follows:

$$\Sigma_{(i,j) \in W} |(I_1(i,j) - I_2(x+i, y+j))^2 \quad (1)$$

where, $I_1$ and $I_2$ are images to be compared and i, j, x+i and x+j are respective pixel position values.

The comparator block 515 may be configured to compare the results of the generated SAD/SSD values for the target template and (one or more of) the candidate template(s). The similarity/template selection block 520 may be configured to select a candidate template as the template for use in the encoding of the un-encoded pixels based on how similar the candidate template is to the target template. In other words, the similarity/template selection block 520 may be configured to select the most similar candidate block as a matched template for use in the encoding of the pixel(s) to be encoded.

The flow diagram for template prediction described above with regard to FIG. 5 includes the blocks shown. However, example embodiments are not limited thereto. Additional blocks may be added based on the different prediction configurations and/or techniques used. Further, each of the blocks shown in the flow diagram for template prediction described above with regard to FIG. 5 may be optional blocks based on the different prediction configurations and/or techniques used. Further, the order of each of the blocks shown in the flow diagram for template prediction described above with regard to FIG. 5 may be rearranged based on the different prediction configurations and/or techniques used.

FIGS. 6-9 are flowcharts of methods according to example embodiments. The steps described with regard to FIGS. 6-9 may be performed due to the execution of software code stored in a memory (e.g., at least one memory 110) associated with an apparatus (e.g., as shown in FIG. 1) and executed by at least one processor (e.g., at least one processor 105) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 6-9.

Figure 6:
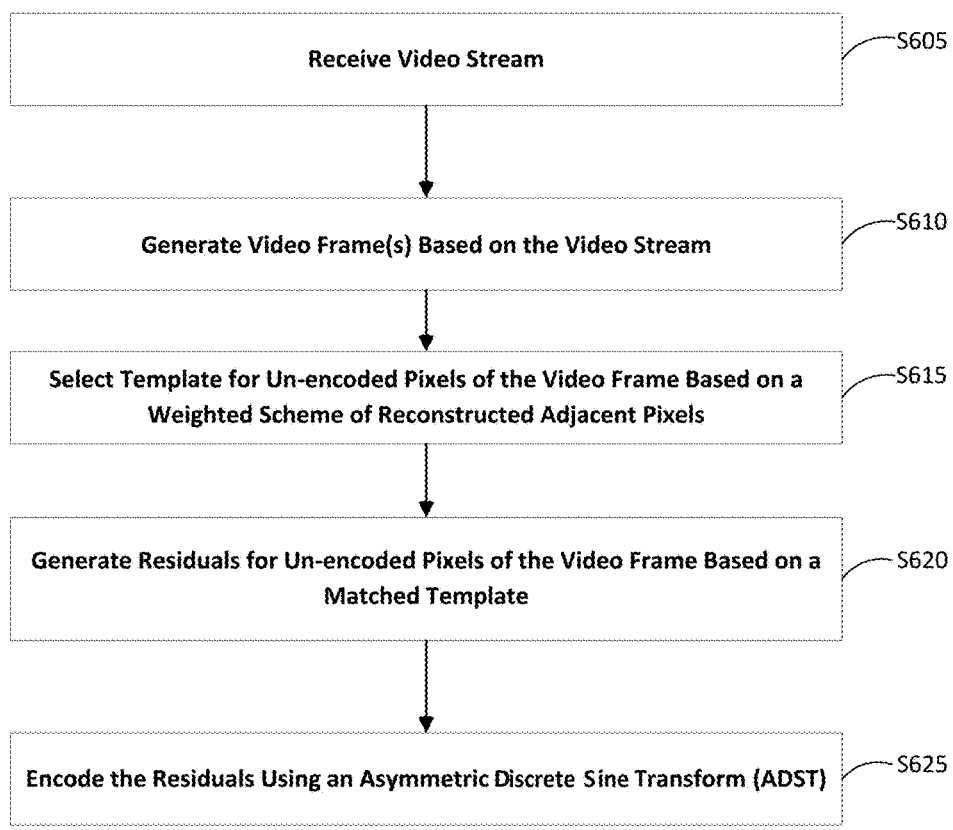
FIGS. 6-9 are flowcharts of methods for encoding/decoding a video frame according to at least one example embodiment.

FIG. 6 is a flowchart of a method for encoding a video frame according to at least one example embodiment. As shown in FIG. 6, in step S605 a video encoder (e.g., video encoder 125) receives a video stream (e.g., video stream 5). For example, the video stream may be a real time video stream (e.g., a video conference or a video chat). For example, the video stream may be a previously recorded video (e.g., a movie or a video recorder recording).

In step S610 the video encoder generates at least one video frame based on the video stream. For example, the processor may convert the video stream input 5 into discrete video frames. The video encoder may further convert each discrete video frame into a matrix of blocks (hereinafter referred to as blocks). For example, a video frame may be converted to a 16×16, a 16×8, an 8×8 or a 4×4 matrix of blocks each having a number of pixels. Although four example matrices are listed, example embodiments are not limited thereto.

In step S615 the video encoder selects a template (e.g., a matched template) for un-encoded pixels of the video frame based on a weighted scheme of reconstructed adjacent pixels. For example, the video encoder may compare a target template to at least one candidate template and select, as the template, the candidate template that is most correlated to the target template. The target template may be based on at least one adjacent (to the un-encoded pixel(s)) row and/or column of pixels. The at least one adjacent (to the un-encoded pixel(s)) row and/or column of pixels may be within the reconstructed area of the matrix of blocks. The candidate template may be within the reconstructed area of the matrix of blocks. The at least one adjacent (to the un-encoded pixel(s)) row and/or column of pixels may be weighted based on their proximity to the un-encoded pixel(s). For example, the target template may include 2 rows and 2 columns of pixels above and to the left of any given (un-encoded) block, and a weight ratio of 3:2 for the inner row/column versus the outer row/column may be used (as shown in FIG. 4). A SAD or a SSD algorithm (other algorithms for measuring the similarity between image blocks are also within the scope of this disclosure) may be used for measuring the similarities between the weighted target template and the candidate template. In other words, selecting a template may include measuring a similarity between image blocks of a video frame based on a weighted scheme of reconstructed adjacent pixels. The measurement may use a SAD or a SSD algorithm.

In step S620 the video encoder generates residuals for un-encoded pixels of the video frame based on a matched template. For example, at least one value associated with each pixel may be subtracted from a corresponding value associated with a corresponding block of the selected template (e.g., block 325).

In step S625 the video encoder encodes the residuals using an asymmetric discrete sine transform (ADST). For example, the generated pixels may be transformed (encoded or compressed) using an ADST. An ADST has a basis function that possesses the desired asymmetric properties (as compared to a DST). More specifically, the basis functions of ADST vanish at the known prediction boundary and maximize at the far end. In other words (referring to FIG. 4), the basis function corresponding to the pixels (of the target template) closer to the un-encoded block (e.g., block 410) are minimal as compared to those distant to the un-encoded block (e.g., block 415). Accordingly, assuming the template of a matched reference block closely approximates that of a block of interest, it is likely that pixels close to these known boundaries are also well predicted, while those distant pixels are less correlated, which results in a relatively higher residual variance.

The ADST has basis function as follows:

$$[T_s]_{j,i} = \left( \frac{2}{\sqrt{2N+1}} \sin\frac{(2j-1)i\pi}{2N+1} \right) \quad (3)$$

where, N is the block size, i, j∈{1, 2, . . . , N} denote the time and frequency indexes, respectively.

Figure 7:
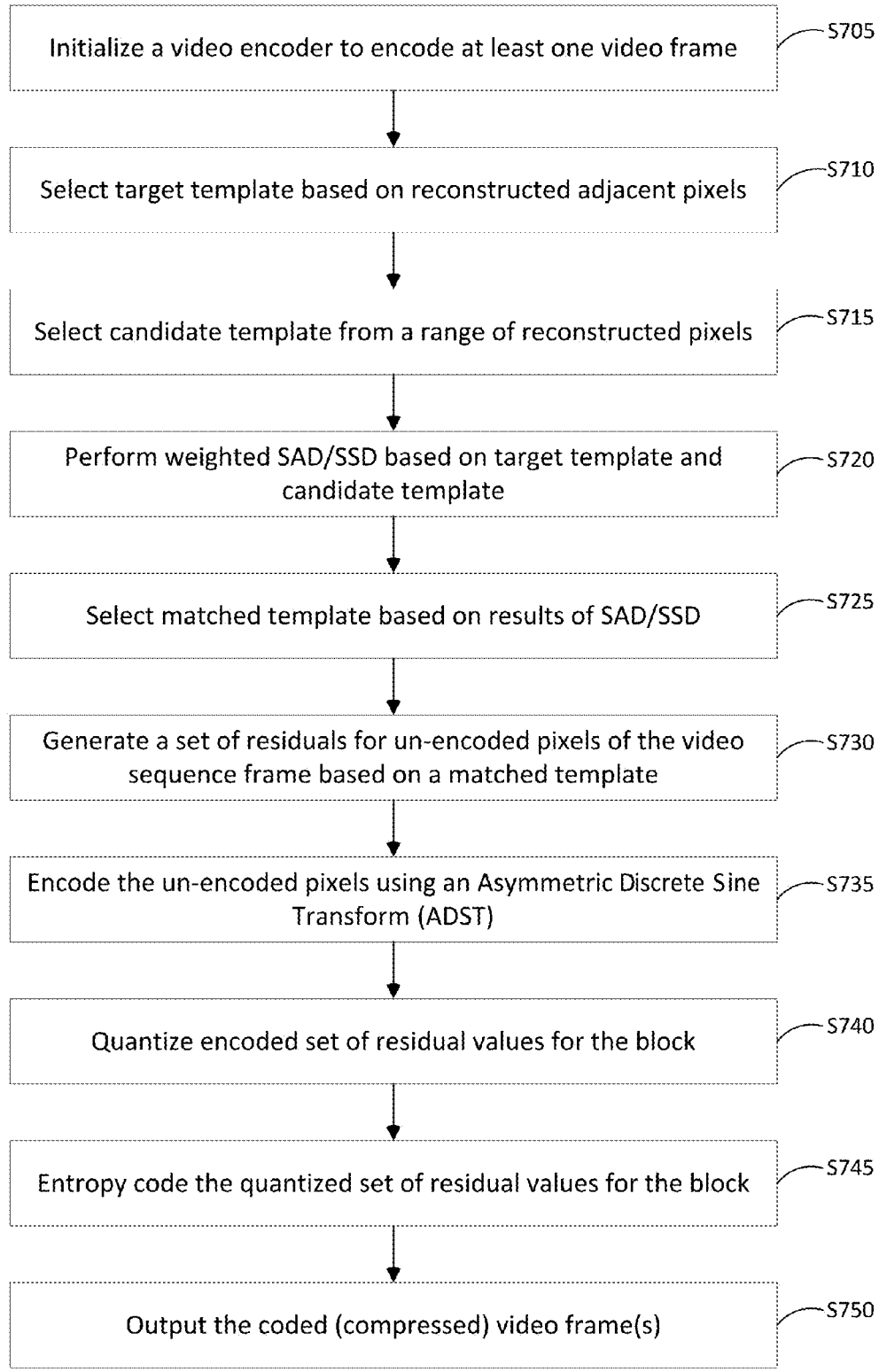

FIG. 7 is a flowchart of another method for encoding a video frame according to at least one example embodiment. As shown in FIG. 7, in step S705 a controller (e.g., controller 120) initializes a video encoder (e.g., video encoder 125) to encode at least one video frame. For example, the video encoder may receive a video stream input 5, break the stream into a plurality of video frames and select the first video frame. The controller may also set initial configurations. For example, the controller may set an intra-frame coding scheme or mode.

In step S710 the encoder selects a target template based on reconstructed adjacent pixels. For example, as discussed above with regard to FIGS. 3-5, in an intra-frame coding scheme, the encoder (via implementation of the prediction block 205) selects an above, a left and/or a combination of the above and left column of pixels in a reconstructed pixel area (e.g., reconstructed pixels 305) as a target template. The selection of a target template may include selecting one or more rows and/or columns of reconstructed pixels.

In step S715 the encoder selects a candidate template from a range of reconstructed pixels. For example, the range can be within the reconstructed image blocks of the video frame. For example, as discussed above with regard to FIGS. 3-5, in an intra-frame coding scheme, the encoder (via implementation of the prediction block 205) selects a portion of the reconstructed pixel area (e.g., reconstructed pixels 305) as the candidate template. The candidate template may include a shape (e.g., 2×2 blocks) corresponding to the shape of the pixels to be encoded. The portion of the reconstructed pixel area may include the entire reconstructed pixel area or some subset thereof. As a result, processing may be minimized during intra-frame coding by limiting (e.g., to a portion of the reconstructed pixel area) a search area within the reconstructed pixel area. During the intra-frame coding scheme a plurality of candidate templates may be identified such that each of the plurality of identified candidate templates may be utilized in a future operation associated with selecting a matched template for the intra-frame coding scheme.

In step S720 the encoder performs a weighted SAD/SSD based on target template and candidate template. For example, as discussed above, a SAD and a SSD are algorithms for measuring the similarity between image blocks. Example embodiments are not limited to SAD and SSD algorithms. The SAD and/or SSD algorithm can take the selected target template and selected the candidate template as inputs. Then, utilizing one of equation 1 or 2 calculate a number or set of numbers that indicate the similarity between the selected target template and the selected candidate template. As discussed above, the selection of the target template may include selecting one or more rows and/or columns of reconstructed pixels. Therefore, in example implementations, the encoder may utilize a weighting algorithm for the one or more rows and/or columns of reconstructed pixels where a weight ratio (e.g., 3:2) for the inner row/column versus the outer row/column may be used as described with regard to FIG. 4 above.

In step S725 the encoder selects matched template based on results of SAD/SSD. For example, the encoder may be configured to select a candidate template as the matched template for use in the encoding of the un-encoded pixels based on how similar the candidate template is to the target template. In other words, the encoder may be configured to select the most similar candidate template (e.g., the candidate template having the lowest SAD/SSD) as the template for use in the encoding of the pixel(s) to be encoded.

In step S730 the encoder generates a set of residuals for un-encoded pixels of the video sequence frame based on a matched template. For example, at least one value associated with each pixel may be subtracted from a corresponding value associated with a corresponding block of the selected template. In step S735 the encoder encodes the un-encoded pixels using an asymmetric discrete sine transform (ADST). For example, the generated pixels may be transformed (encoded or compressed) using an ADST. An ADST has a basis function that possesses the desired asymmetric properties (as compared to a DCT). More specifically, the basis functions of ADST vanish at the known prediction boundary and maximize at the far end. In other words (referring to FIG. 4), the basis function corresponding to the pixels closer to the block 410 are minimal as compared to those distant to the block 415. Accordingly, assuming the template of a matched reference block closely approximates that of a block of interest, it is likely that pixels close to these known boundaries are also well predicted, while those distant pixels are less correlated, which results in a relatively higher residual variance. The ADST may utilize equation 3 described above.

In step S740 the encoder quantizes the encoded set of residual values for the block. For example, the controller 120 may instruct (or invoke) the quantization block 215 to quantize the coded motion vectors and the coded residual errors, through any reasonably suitable quantization techniques. In addition, at step S745, the controller 120 may instruct the entropy coding block 220 to, for example, assign codes to the quantized motion vector codes and residual error codes to match code lengths with the probabilities of the quantized motion vector codes and residual error codes, through any coding technique.

In step S750 the encoder outputs the coded (compressed) video frame(s). For example, the controller 120 may output the coded video (e.g., as coded video frames) to one or more output devices. The controller 120 may output the coded video as a single motion vector and a single set of predictor values (e.g., residual errors) for the macroblock. The controller 120 may output information indicating the mode or scheme use in intra-frame coding by the encoder. For example, the coded (compressed) video frame(s) may include a header for transmission. The header may include, amongst other things, the information indicating the mode or scheme use in intra-frame coding by the encoder.

Figure 8:
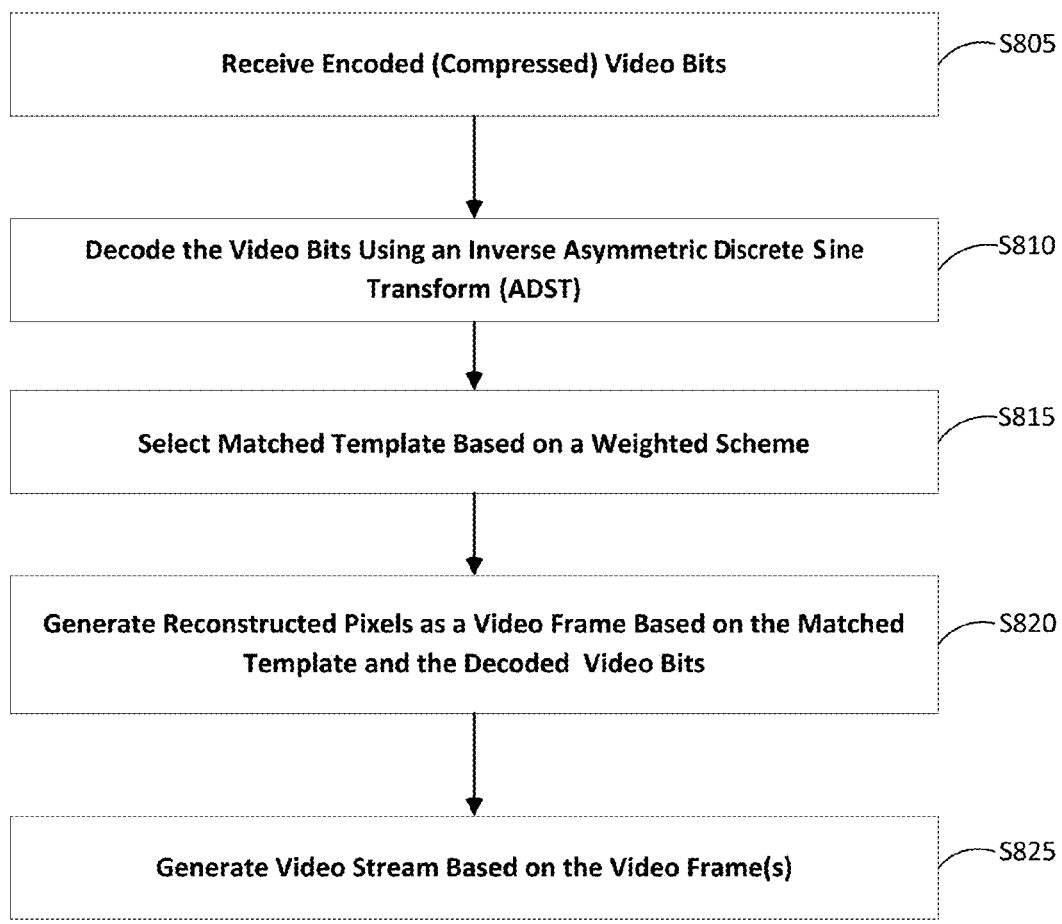

FIG. 8 is a flowchart of a method for decoding a video frame according to at least one example embodiment. As shown in FIG. 8, in step S805 a video decoder (e.g., video decoder 175) receives encoded (compressed) video bits (e.g., compressed video bits 10). For example, the encoded (compressed) video bits may be a previously encoded (e.g., by video encoder 125) real time video stream (e.g., a video conference or a video chat) received via communication network (e.g., Internet or Intranet). For example, the video stream may be a previously recorded video (e.g., a movie or a video recorder recording).

In step S810 the video decoder decode the video bits using an inverse asymmetric discrete sine transform (ADST). For example, the generated pixels may be transformed (or decompressed) using an inverse ADST. The resultant transformed (or decompressed) video bits may be known as residuals. As discussed above, an ADST has a basis function that possesses the desired asymmetric properties (as compared to a DCT). More specifically, the basis functions of ADST vanish at the known prediction boundary and maximize at the far end. In other words (referring to FIG. 4), the basis function corresponding to the pixels closer to the block 410 are minimal as compared to those distant to the block 415. Accordingly, assuming the template of a matched reference block closely approximates that of a block of interest, it is likely that pixels close to these known boundaries are also well predicted, while those distant pixels are less correlated, which results in a relatively higher residual variance. The inverse ADST may be an inverse function based on equation 3 above.

In step S815 the video decoder selects a matched template based on a weighted scheme. For example, the video decoder may compare a target template to at least one candidate template and select, as the template, the candidate template that is most correlated to the target template. The target template may be based on at least one adjacent (e.g., to the yet to be reconstructed pixel(s)) row and/or column of pixels. The at least one adjacent (e.g., to the yet to be reconstructed pixel(s)) row and/or column of pixels may be within the reconstructed area of the matrix of blocks. The candidate template may be within the reconstructed area of the matrix of blocks. The at least one adjacent (e.g., to the yet to be reconstructed pixel(s)) row and/or column of pixels may be weighted based on their proximity to the reconstructed pixel(s). For example, the target template may include 2 rows and 2 columns of pixels above and to the left of any given (to be reconstructed) block, and a weight ratio of 3:2 for the inner row/column versus the outer row/column may be used (as shown in FIG. 4). A SAD or a SSD algorithm (other algorithms for measuring the similarity between image blocks are also within the scope of this disclosure) may be used for measuring the similarities between the weighted target template and the candidate template.

In step S820 the video decoder generates reconstructed pixels as a video frame based on the matched template and the decoded video bits. For example, the video decoder may add the residuals (e.g., transformed or decompressed video bits) to the corresponding position in the matched template resulting in a reconstructed pixel. In step S825 the video decoder generates a video stream based on the video frame(s). For example, at least one video frame of reconstructed pixels may be organized in a sequence to form a video stream.

Figure 9:
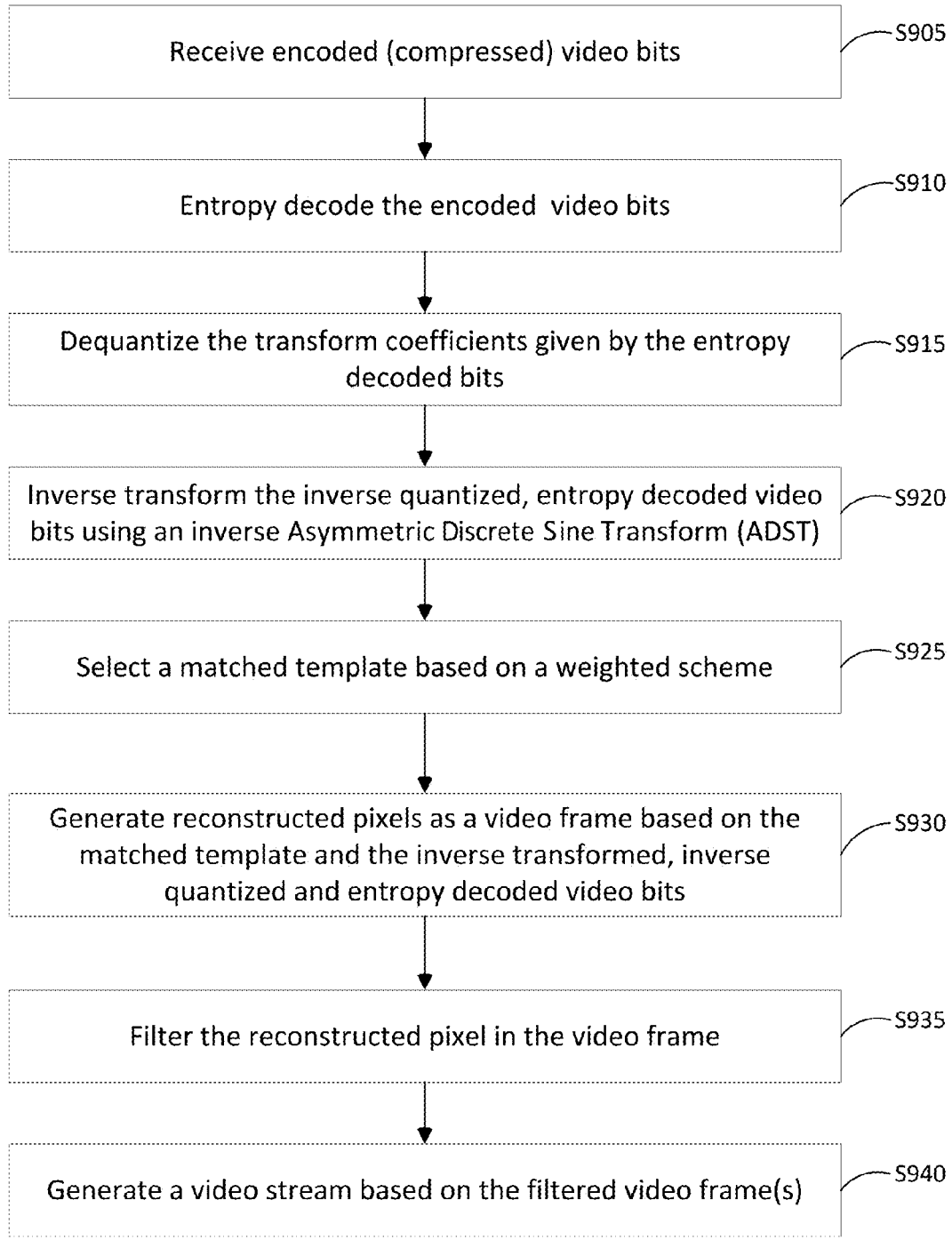

FIG. 9 is a flowchart of another method for decoding a video frame according to at least one example embodiment. As shown in FIG. 9, in step S905 a video decoder (e.g., video decoder 175) receives encoded (compressed) video bits (e.g., compressed video bits 10). For example, the encoded (compressed) video bits may be a previously encode (e.g., by video encoder 125) real time video stream (e.g., a video conference or a video chat) received via communication network (e.g., Internet or Intranet). For example, the video stream may be a previously recorded video (e.g., a movie or a video recorder recording). The coded (compressed) video frame(s) may include a header for transmission. The header may include, amongst other things, the information indicating the mode or scheme use in intra-frame coding by the encoder.

In step S910 the video decoder entropy decodes the encoded video bits. For example, the compressed video bits can be decoded by entropy decoding using, for example, Context Adaptive Binary Arithmetic Decoding to produce a set of quantized transform coefficients. In step S915 the video decoder de-quantizes the transform coefficients given by the entropy decoded bits. For example, the entropy decoded video bits can be de-quantized by mapping values within a relatively small range to values in a relatively large range (e.g. opposite of the quantization mapping described above).

In step S920 the video decoder inverse transforms the video bits using an inverse asymmetric discrete sine transform (ADST). For example, the generated pixels may be transformed (or decompressed) using an inverse ADST based on an indication of the mode or scheme use in intra-frame coding by the encoder. The resultant transformed (or decompressed) video bits may be known as residuals. As discussed above, an ADST has a basis function that possesses the desired asymmetric properties (as compared to a DST). More specifically, the basis functions of ADST vanish at the known prediction boundary and maximize at the far end. In other words (referring to FIG. 4), the basis function corresponding to the pixels closer to the block 410 are minimal as compared to those distant to the block 415. Accordingly, assuming the template of a matched reference block closely approximates that of a block of interest, it is likely that pixels close to these known boundaries are also well predicted, while those distant pixels are less correlated, which results in a relatively higher residual variance. The inverse ADST may be an inverse function based on equation 3 above.

In step S925 the video decoder selects a matched template based on a weighted scheme. The video decoder selects the matched template based on a weighted scheme for prediction based on an indication of the mode or scheme use in intra-frame coding by the encoder. For example, the video decoder may compare a target template to at least one candidate template and select, as the template, the candidate template that is most correlated to the target template. The target template may be based on at least one adjacent (e.g., to the yet to be reconstructed pixel(s)) row and/or column of pixels. The at least one adjacent (e.g., to the yet to be reconstructed pixel(s)) row and/or column of pixels may be within the reconstructed area of the matrix of blocks. The candidate template may be within the reconstructed area of the matrix of blocks. The at least one adjacent (e.g., to the yet to be reconstructed pixel(s)) row and/or column of pixels may be weighted based on their proximity to the reconstructed pixel(s). For example, as discussed above, the target template may include 2 rows and 2 columns of pixels above and to the left of any given (to be reconstructed) block, and a weight ratio of 3:2 for the inner row/column versus the outer row/column may be used (as shown in FIG. 4). A SAD or a SSD algorithm (other algorithms for measuring the similarity between image blocks are also within the scope of this disclosure) may be used for measuring the similarities between the weighted target template and the candidate template.

In step S930 the video decoder generates reconstructed pixels as a video frame based on the matched template. For example, the video decoder may add the residuals (e.g., transformed or decompressed video bits) to the corresponding position in the matched template resulting in a reconstructed pixel.

In step S935 the video decoder filters the reconstructed pixel in the video frame. For example, a loop filter can be applied to the reconstructed block to reduce blocking artifacts. For example, a deblocking filter can be applied to the reconstructed block to reduce blocking distortion.

In step S940 the video decoder generates a video stream based on the video frame(s). For example, at least one video frame of reconstructed pixels may be organized in a sequence to form a video stream.

As will be appreciated, the system 100 and 150 illustrated in FIGS. 1A and 1B may be implemented as an element of and/or an extension of the generic computer device 1000 and/or the generic mobile computer device 1050 described below with regard to FIG. 10. Alternatively, or in addition to, the system 100 and 150 illustrated in FIGS. 1A and 1B may be implemented in a separate system from the generic computer device 1000 and/or the generic mobile computer device 1050 having some or all of the features described below with regard to the generic computer device 1000 and/or the generic mobile computer device 1050.

Figure 10:
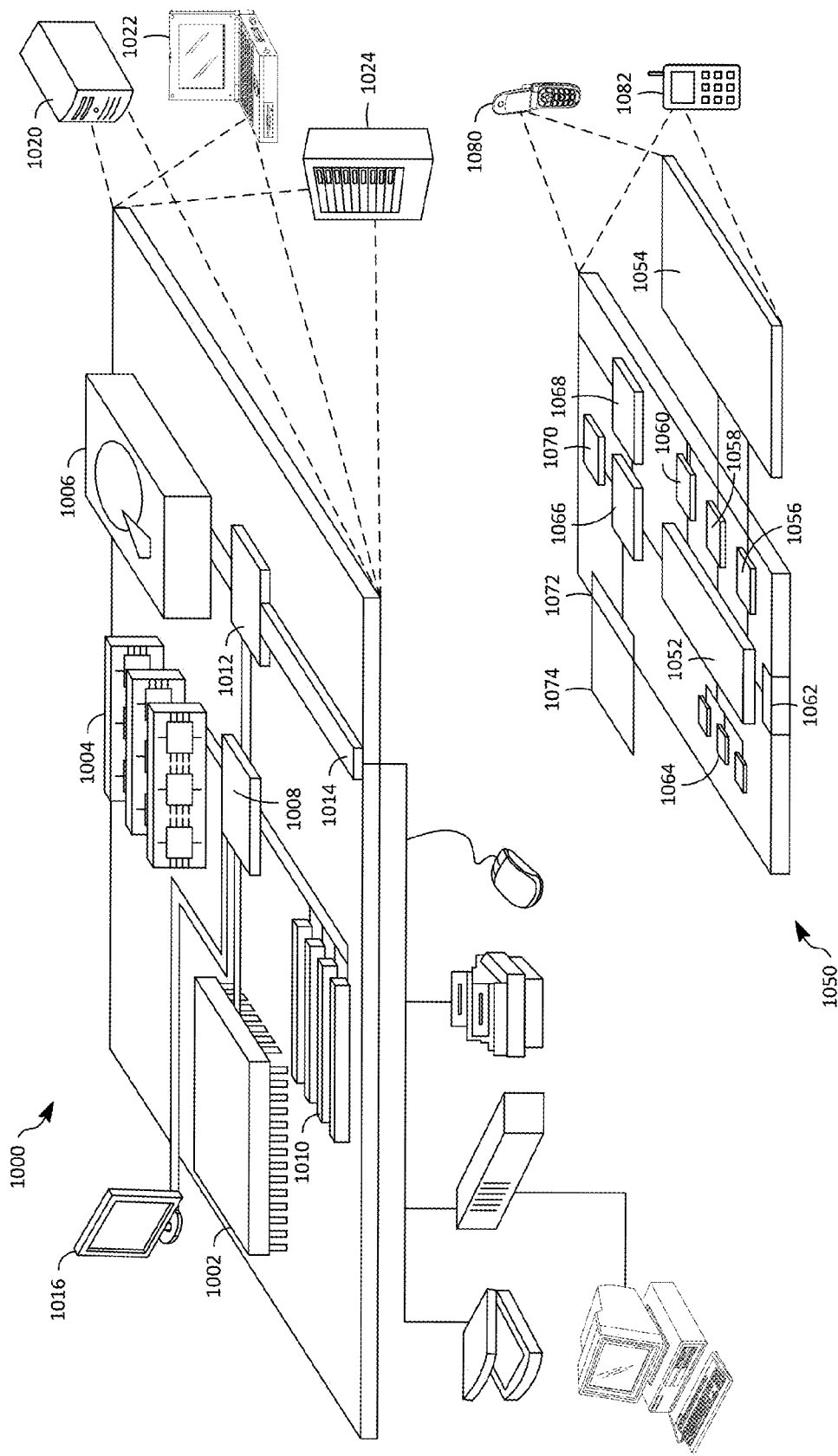
FIG. 10 is a schematic block diagram of a computer device and a mobile computer device that can be used to implement the techniques described herein.

FIG. 10 is a schematic block diagram of a computer device and a mobile computer device that can be used to implement the techniques described herein. FIG. 10 is an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing partitions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Partitions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for encoding video data, the method comprising:
   generating a plurality of candidate templates using a weighted scheme of reconstructed adjacent pixels, the reconstructed adjacent pixels being in one of:
      an above row of pixels next to a boundary of an un-encoded image block of a video frame to be encoded, and
      a left column of pixels next to the boundary of the un-encoded image block of the video frame to be encoded;
   measuring a similarity between the un-encoded image block and each of the plurality of candidate templates;
   the weighted scheme including assigning a higher weight to pixels closer to the boundary than pixels further away from the boundary for measuring the similarity;
   selecting a matched template for the un-encoded image block based on the measuring of the similarity between the un-encoded image block and each of the plurality of candidate templates;
   generating at least one residual for the un-encoded pixel of the video frame based on the selected matched template; and
   encoding the at least one residual using an asymmetric discrete sine transform (ADST).

2. The method of claim 1, wherein:
   the measuring of the similarity between image blocks includes using a sum of absolute difference (SAD) algorithm, and
   a comparatively smaller SAD value indicates a closer similarity.

3. The method of claim 1, wherein the selecting of the matched template includes:
   selecting a first adjacent above row of pixels;
   selecting a second adjacent above row of pixels, the second adjacent above row of pixels being an outer row and the first adjacent above row of pixels being an inner row as compared to the un-encoded pixels of the video frame;
   associating a weight ratio with the first adjacent above row of pixels and the second adjacent above row of pixels such that first adjacent above row of pixels is given a higher weight than the second adjacent above row of pixels; and
   selecting the matched template based on a sum of absolute difference of the first adjacent above row of pixels and second adjacent above row of pixels.

4. The method of claim 1, wherein the selecting of the matched template includes:
   selecting a first adjacent left column of pixels;
   selecting a second adjacent left column of pixels, the second adjacent left column of pixels being an outer column and the first adjacent left column of pixels being an inner column as compared to the un-encoded pixels of a video frame;
   associating a weight ratio with the first adjacent left column of pixels and the second adjacent left column of pixels such that first adjacent left column of pixels is given a higher weight than the second adjacent left column of pixels; and selecting the matched template based on a sum of absolute difference of the first adjacent left column of pixels and second adjacent left column of pixels.

5. The method of claim 1, wherein the selecting of the matched template includes:
   searching a reconstructed area of the video frame for a candidate template;
   selecting the matched template as the candidate template having a lowest value calculated using a lowest value of an algorithm for measuring the similarity between image blocks; and
   selecting a prediction block based on the matched template.

6. The method of claim 1, wherein the selecting of the matched template includes:
   searching a portion of a reconstructed area of the video frame for a candidate template;
   selecting the matched template as the candidate template having a lowest value calculated using a lowest value of an algorithm for measuring the similarity between image blocks; and
   using a block associated with the matched template in the reconstructed area as a prediction block.

7. The method of claim 1, wherein:
   the generating of the at least one residual includes subtracting a prediction block from the un-encoded pixels; and
   the encoding of the at least one residual includes applying the ADST to transform a residual block including the at least one residual, the method further comprising:
   quantizing transform coefficients associated with the encoded at least one residual;
   entropy encoding the quantized transform coefficients as a compressed video bit stream; and
   transmitting the compressed video bit stream including a header indicating an intra-frame coding mode, the intra-frame coding mode indicating template matched prediction and ADST.

8. The method of claim 1, wherein:
   the selecting of the matched template includes selecting at least two reconstructed pixels adjacent to the un-encoded pixels as a target template;
   the encoding of the at least one residual is based on an asymmetric property of the at least two reconstructed pixels; and
   the asymmetric property is based on a similarity of the at least two reconstructed pixels to the un-encoded pixel.

9. A method for decoding video data, the method comprising:
   decoding compressed video bits as at least one residual using an asymmetric discrete sine transform (ADST);
   generating a plurality of candidate templates using a weighted scheme of reconstructed adjacent pixels, the reconstructed adjacent pixels being in one of:
      an above row of pixels next to a boundary of an un-encoded image block of a video frame to be encoded, and
      a left column of pixels next to the boundary of the un-encoded image block of the video frame to be encoded;
   measuring a similarity between image blocks of a video frame and each of the plurality of candidate templates;
   the weighted scheme includes assigning a higher weight to pixels closer to the boundary than the pixels further away from the boundary for measuring the similarity;
   selecting a matched template for the un-encoded pixel of the video frame based on the measuring of the similarity between the image blocks and each of the plurality of candidate templates; and
   generating at least one reconstructed pixel of the video frame based on the matched template and the decoded compressed video bits.

10. The method of claim 9, wherein:
   the measuring of the similarity between image blocks includes using a sum of absolute difference (SAD) algorithm; and
   a comparatively smaller SAD value indicates a closer similarity.

11. The method of claim 9, wherein the selecting of the matched template includes:
   selecting a first adjacent above row of pixels;
   selecting a second adjacent above row of pixels, the second adjacent above row of pixels being an outer row and the first adjacent above row of pixels being an inner row as compared to an un-reconstructed pixel of the video frame;
   associating a weight ratio with the first adjacent above row of pixels and the second adjacent above row of pixels such that first adjacent above row of pixels is given a higher weight than the second adjacent above row of pixels; and
   selecting the matched template based on a weighted sum of absolute difference of the first adjacent above row of pixels and second adjacent above row of pixels.

12. The method of claim 9, wherein the selecting of the matched template includes:
   selecting a first adjacent left column of pixels;
   selecting a second adjacent left column of pixels, the second adjacent left column of pixels being an outer column and the first adjacent left column of pixels being an inner column as compared to the un-reconstructed pixels of the video frame;
   associating a weight ratio with the first adjacent left column of pixels and the second adjacent left column of pixels such that first adjacent left column of pixels is given a higher weight than the second adjacent left column of pixels; and
   selecting the matched template based on a weighted sum of absolute difference of the first adjacent left column of pixels and second adjacent left column of pixels.

13. The method of claim 9, wherein the selecting of the matched template includes:
   searching a reconstructed area of the video frame for a candidate template; and
   selecting the matched template as the candidate template having a lowest value calculated using a lowest value of an algorithm for measuring the similarity between image blocks.

14. The method of claim 9, wherein the selecting of the matched template includes:
   searching a portion of a reconstructed area of the video frame for a candidate template;
   selecting the matched template as the candidate template having a lowest value calculated using a lowest value of an algorithm for measuring the similarity between image blocks; and
   using a block associated with the matched template in the reconstructed area as a prediction block.

15. The method of claim 9, further comprising:
   receiving an encoded bit stream including a header indicating a intra-frame coding mode, the intra-frame coding mode indicating template matched prediction and ADST;

entropy decoding the encoded bit stream to generate quantized encoded transform coefficients;

de-quantizing the quantized encoded transform coefficients to generate encoded transform coefficients;

applying the inverse ADST to the encoded transform coefficients to generate at least one reconstructed prediction residual; and adding the at least one reconstructed prediction residual to a prediction block associated with the matched template to reconstruct a pixel block.

16. A video coding system, comprising:
an encoder configured to:
   generate a plurality of candidate templates using a weighted scheme of reconstructed adjacent pixels, the reconstructed adjacent pixels being in one of:
      an above row of pixels next to a boundary of an un-encoded image block of a video frame to be encoded, and
      a left column of pixels next to the boundary of the un-encoded image block of the video frame to be encoded;
   measure a similarity between the un-encoded image block and each of the plurality of candidate templates;
   the weighted scheme includes assigning a higher weight to pixels closer to the boundary than the pixels further away from the boundary;
   select a first matched template for the un-encoded block based on the measuring of the similarity between the un-encoded block and each of the plurality of candidate templates;
   generate at least one residual for the un-encoded pixels of the video frame based on the first matched template; and
   encode the at least one residual as compressed bits using an asymmetric discrete sine transform (ADST); and
a decoder configured to:
   decode the compressed video bits as at least one residual using the ADST;
   measure a similarity between image blocks of a video frame based on a weighted scheme of reconstructed adjacent pixels;
   select a second matched template for an un-encoded pixel of the video frame based on the measuring of the similarity between the image blocks; and
   generate reconstructed pixels of the video frame based on the second matched template and the decoded compressed video bits.

17. The video coding system of claim 16, wherein:
the measuring of the similarity between image blocks in the encoder and the decoder includes using a sum of absolute difference (SAD) algorithm; and
a comparatively smaller SAD value indicates a closer similarity.

18. The video coding system of claim 16, wherein the selecting of at least one of the first and the second matched template includes:
   selecting a first adjacent above row of pixels;
   selecting a second adjacent above row of pixels, the second adjacent above row of pixels being an outer row and the first adjacent above row of pixels being an inner row as compared to a pixel of the video frame;
   associating a weight ratio with the first adjacent above row of pixels and the second adjacent above row of pixels such that first adjacent above row of pixels is given a higher weight than the second adjacent above row of pixels; and
   selecting the matched template based on a weighted sum of absolute difference of the first adjacent above row of pixels and second adjacent above row of pixels.

19. The video coding system of claim 16, wherein the selecting of at least one of the first and the second matched template includes:
   selecting a first adjacent left column of pixels;
   selecting a second adjacent left column of pixels, the second adjacent left column of pixels being an outer column and the first adjacent left column of pixels being an inner column as compared to a pixel of the video frame;
   associating a weight ratio with the first adjacent left column of pixels and the second adjacent left column of pixels such that first adjacent left column of pixels is given a higher weight than the second adjacent left column of pixels; and
   selecting the matched template based on a weighted sum of absolute difference of the first adjacent left column of pixels and second adjacent left column of pixels.

20. The video coding system of claim 16, wherein the selecting of at least one of the first and the second matched template includes:
   searching a reconstructed area of the video frame for a candidate template;
   selecting the matched template as the candidate template having a lowest value calculated using a lowest value of an algorithm for measuring the similarity between image blocks; and
   selecting a prediction block based on the matched template.

21. The video coding system of claim 16, wherein the selecting of at least one of the first and the second matched template includes:
   searching a portion of a reconstructed area of the video frame for a candidate template;
   selecting the matched template as the candidate template having a lowest value calculated using a lowest value of an algorithm for measuring the similarity between image blocks; and
   using a block associated with the matched template in the reconstructed area as a prediction block.

* * * * *